US005792949A

United States Patent [19]
Hewelt et al.

[11] Patent Number: 5,792,949
[45] Date of Patent: Aug. 11, 1998

[54] CRANKCASE VENTILATION SYSTEM DIAGNOSTIC

[75] Inventors: James Michael Hewelt, White Lake; Etsuko Muraji Stewart, Laingsburg, both of Mich.

[73] Assignee: General Motors Corporation, Detroit, Mich.

[21] Appl. No.: 705,895

[22] Filed: Aug. 28, 1996

[51] Int. Cl.⁶ .................................................. G01M 15/00
[52] U.S. Cl. ........................................ 73/117.3; 123/41.86
[58] Field of Search ............................ 123/41.86, 317, 123/572, 573, 574; 73/116, 117.2, 117.3, 118.1

[56] References Cited

U.S. PATENT DOCUMENTS

| | | | |
|---|---|---|---|
| 3,372,685 | 3/1968 | Bestland et al. | 123/41.86 |
| 3,620,197 | 11/1971 | Albright et al. | 123/41.86 |
| 3,630,076 | 12/1971 | Staudt . | |
| 3,672,172 | 6/1972 | Hammond | 123/317 |
| 3,864,964 | 2/1975 | Voelz . | |
| 3,880,130 | 4/1975 | Hecht | 123/574 |
| 3,992,878 | 11/1976 | Moorman . | |
| 4,353,332 | 10/1982 | Sweetland | 123/41.86 |
| 4,475,499 | 10/1984 | Sheaffer | 123/317 |
| 5,069,192 | 12/1991 | Matsumoto et al. | 123/41.86 |
| 5,090,393 | 2/1992 | Holch | 123/574 |
| 5,228,424 | 7/1993 | Collins | 123/574 |
| 5,499,604 | 3/1996 | Ito et al. | 123/41.86 |
| 5,564,401 | 10/1996 | Dickson | 123/573 |

OTHER PUBLICATIONS

U.S. application No. 08/740,177, Patel et al., filed Oct. 1996.
U.S. application No. 08/740,178, O'Daniel, Filed Oct. 1996.

*Primary Examiner*—Ronald L. Biegel
*Assistant Examiner*—Eric S. McCall
*Attorney, Agent, or Firm*—Michael J. Bridges

[57] ABSTRACT

A positive crankcase ventilation system diagnostic applied in an automotive internal combustion engine with a pressure sensor disposed in the system for continuous sensing of system pressure while the engine is running in a steady state operating condition, with minimum and maximum sensed pressure values stored during each of repeated test periods. Pressure values exceeding a predetermined normal range over at least one test period indicate a leak or restriction condition in the system. Small differences in pressure values over test periods indicate sensor or electrical fault conditions. Fault conditions are logged and are indicated if persistent.

10 Claims, 4 Drawing Sheets

1

CRANKCASE VENTILATION SYSTEM DIAGNOSTIC

FIELD OF THE INVENTION

This invention relates to automotive internal combustion engine diagnostics and, more particularly, to engine crankcase ventilation system diagnostics.

BACKGROUND OF THE INVENTION

Internal combustion engine crankcase ventilation is generally understood to be required to remove combustion gases and unburned hydrocarbons, termed "blow-by gases," that leak by piston rings during combustion, leading to degradation in engine component materials and contamination of engine oil. Positive crankcase ventilation (PCV), purges blow-by gases from the crankcase, separates oil from the blow-by gases and returns the gases to an engine intake manifold to be consumed. PCV systems typically are relatively complex, including a purge control valve (PCV valve), a breather element and a plurality of flow lines with connections between the crankcase, the intake manifold, and a fresh air source. Flow restrictions in the PCV valve, the breather element or in any of the flow lines, or leaks in the flow lines can interfere with effective purging of the blow-by gases, potentially leading to reduced engine performance and increased emissions. Currently, only when such restrictions or leaks are of an extreme character, for example as may cause perceptible degradation in engine performance, are they diagnosed and eventually treated. A performance or emissions penalty may be paid from the time the restriction or leak condition develops to the time of the proper treatment thereof.

It would therefore be desirable to diagnose restriction or leak conditions in a PCV system as soon as any such condition reaches a level that can negatively affect engine performance or emissions, to minimize any delay in treatment of the condition.

SUMMARY OF THE INVENTION

The present invention provides a desirable PCV system diagnostic that detects any significant restriction or leak condition in the PCV system that may negatively affect PCV system performance. Further, the diagnostic of this invention is self-diagnosing and adds minimum cost to the PCV system.

More specifically, a pressure or vacuum transducer is introduced into the PCV system in location to most effectively detect a pressure or vacuum change characteristic of a PCV system restriction or leak condition. In accord with one aspect of this invention, the transducer is positioned in proximity to the PCV valve. Engine operating conditions are monitored to detect a stable operating condition under which the transducer may provide information indicating the condition of the PCV system. The pressure of the PCV system is then periodically sampled and logged while the stable operating condition is present over a test period. At the completion of the test period, the sample with the minimum magnitude and the sample with the maximum magnitude are compared to respective calibrated lower and upper threshold values. Excursions beyond either threshold are logged as potential fault conditions. The diagnostic may extend to multiple test periods with the results of each test period logged. If, after a predetermined number of test periods, a persistent fault of a particular character is present, a PCV system fault condition is indicated.

2

In accord with a further aspect of this invention, the type of fault may be identified and indicated depending on the character of any persistent fault condition that is detected. Such fault identification may facilitate treatment of the fault condition. In accord with yet a further aspect of this invention, the transducer output signal may be monitored for reasonableness and a fault condition diagnosed in the transducer or in transducer drive circuitry following a persistent "unreasonable" transducer output signal. Fault conditions in the transducer or drive circuitry may be indicated and identified and any diagnosed PCV system fault conditions may be discredited until the transducer fault condition is remedied. In accord with yet a further aspect of this invention, a fault condition characterized by a relatively constant transducer output signal over a range of engine operating conditions may be diagnosed by monitoring change in the transducer output signal over at least one test period and comparing the transducer output signal change to a calibrated minimum reasonable change value. In accord with yet a further aspect of this invention, comprehensive diagnosis of the PCV system is provided by continuous execution of the diagnostic while the engine is running.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
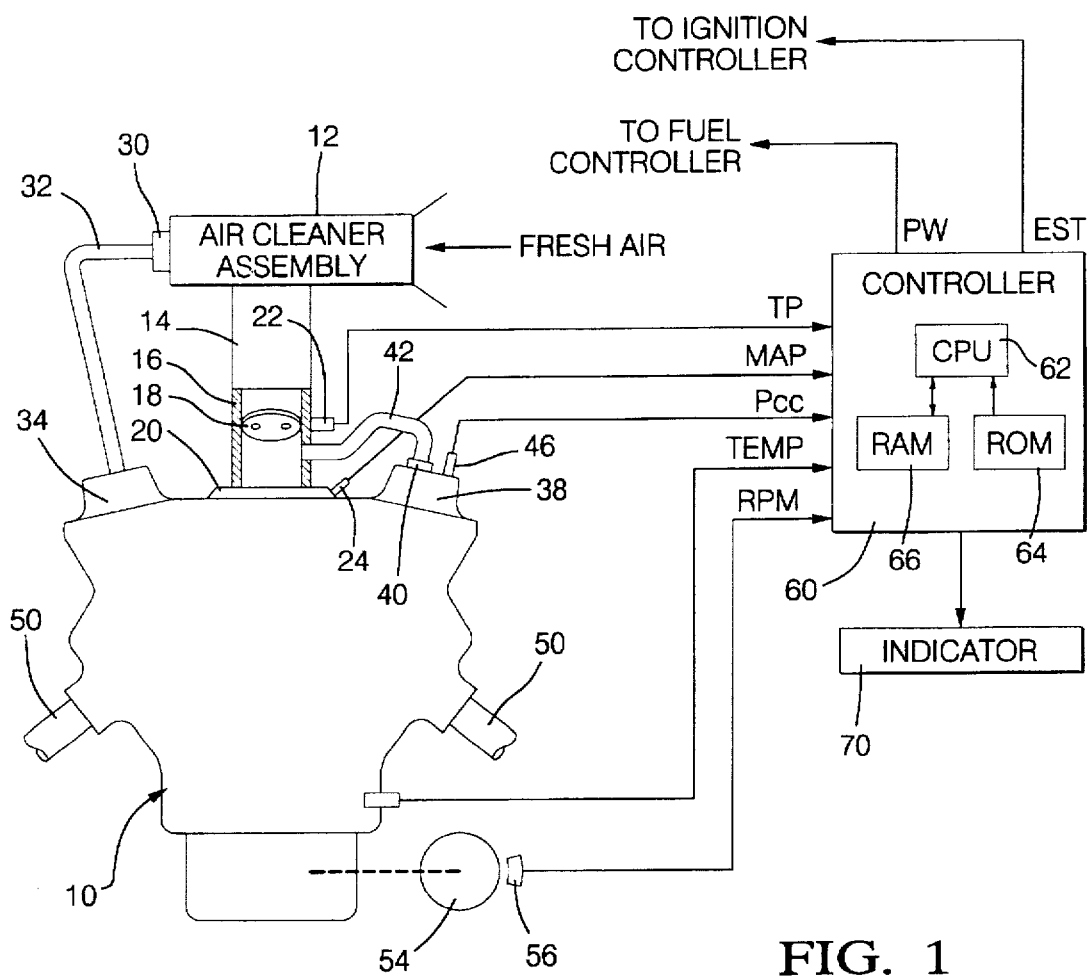
FIG. 1 is a schematic illustration of an installation of the diagnostic of this invention on a PCV system of an internal combustion engine.

Referring to FIG. 1, positive crankcase ventilation (PCV) system hardware installed on an internal combustion engine 10 including diagnostic hardware of a preferred embodiment of the present invention is shown. "Fresh" intake air is passed through an air cleaner assembly 12 including conventional air filter means (not shown) to an intake air passage 14 and then to an intake bore 16 of the engine 10 in which a intake air valve 18 of the butterfly or rotary type is positioned and is rotated, such as under manual control by an engine operator, to vary a degree of restriction of the bore 18 to intake air passing therethrough and into engine intake manifold 20 for distribution to engine cylinders (not shown). The degree of controlled rotation of the intake air valve 18 is transduced by transducer 22 of the rotary potentiometric type into output signal TP. Absolute air pressure in the intake manifold 20 is transduced by conventional pressure sensor 24 into output signal MAP. Engine coolant is circulated through an engine coolant circulation path (not shown) as is well-recognized in the art, with a temperature sensor, such as a thermocouple or thermistor disposed in the circulation path to transduce the temperature of the coolant into output signal TEMP. The intake air is combined with an injected fuel quantity and ignited in engine cylinders while the engine is "running", for reciprocating pistons within corresponding engine cylinders, the pistons rotationally driving an engine output shaft 54, such as a crankshaft. A plurality of circumferentially-aligned, spaced teeth or notches are disposed about the output shaft and pass in proximity to a sensor 56 fixedly mounted on the engine 10 and of the Hall effect or variable reluctance type, for transducing passage of the teeth or notches into periodic output signal RPM having a frequency proportional to engine output shaft rotational rate (hereinafter engine speed), and having individual signal cycles indicating engine cylinder events. Exhaust gas produced during the combustion of the air/fuel mixture in the engine cylinders is guided out of the cylinders through exhaust manifold 50 for catalytic treatment.

Combustion products and unburned hydrocarbons (hereinafter "by-pass gases") may pass by the pistons within the cylinder during the high pressure combustion process and enter the crankcase of the engine. Such by-pass gases are purged from the crankcase through the closed positive crankcase ventilation (PCV) system of this embodiment including the conventional elements of breather element 30, intake passage 32, outlet passage 42, and interface seals. Breather element 30 extends across an opening in the air cleaner assembly 12 for preventing passage of oil into the assembly 12 and intake passage extends between breather element 30 and valve cover 34 to allow passage of fresh air from the air cleaner assembly 12 to the crankcase of the engine. PCV valve is secured in a hole through valve cover 38 preferably a significant distance from the point of delivery of fresh air into the crankcase from intake passage 32. PCV valve is connected to intake manifold 20 through outlet passage 42 so that manifold vacuum is applied to the crankcase through PCV valve for drawing bypass gases out of the crankcase, as is well-established in the art. Rubber seals (not shown) are securely engaged between the ends of intake passage 32 and the breather element 30 and the valve cover and between the ends of the outlet passage 42 and the PCV valve 40 and the intake manifold 20 to normally maintain a closed PCV system. A substantial pressure drop thereby exists across the PCV system, for drawing fresh air into the crankcase from the air cleaner assembly for mixing with bypass gases and for purging the resulting mixture from the crankcase, reducing oil and engine part contamination.

Conventional pressure transducer 46, such as of a type generally known for conventional application in automotive fuel tank pressure transducing, is installed in the valve cover 38 preferably in close proximity to the PCV valve 40 for transducing crankcase air pressure into output signal Pcc. The pressure under stable test conditions, and the variation in pressure in the crankcase indicate the functionality of the PCV system in accord with this invention.

The described output signals including MAP, TP, RPM, TEMP and Pcc are provided as inputs to a controller 60 of the digital microcontroller type which includes such conventional elements as a central processing unit CPU 62, read only memory devices ROM 64 and random access memory devices RAM 66. The CPU 62 includes conventional elements of control circuitry (not shown) for controlling the timing and flow of controller operations and for controlling interaction between the controller elements and arithmetic logic circuitry (not shown) for executing required arithmetic, logic and comparison functions of the controller. The RAM devices include both the volatile type the contents of which may be erased when ignition power is removed from the controller 60, and the nonvolatile type the contents of which survive removal of ignition power from the controller. The controller 60 is activated by an engine operator, such as by manually applying ignition power to the controller to carry out a series of control, diagnostic and maintenance operations including operations to generate and issue fuel control command PW which is applied to a fuel controller for timed application to individual fuel injectors (not shown) and operations to generate ignition timing control command EST applied to an ignition controller for issuing timed spark plug drive commands for timed ignition of the air/fuel mixture in engine cylinders. Still further, the controller carries out PCV system diagnostics for diagnosing PCV system restriction or leak conditions and, in the event such a condition is diagnosed, for logging fault data in a memory device, such as a nonvolatile RAM device 66 and for energizing an indicator 70, such as a lamp visible to the engine operator or an audible alert distinguishable by the engine operator.

Figure 2:
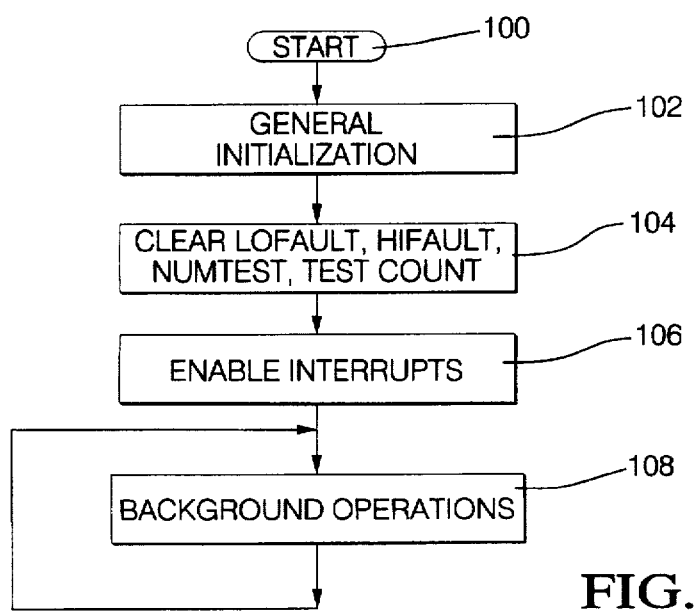
FIGS. 2, 3A and 3B are flow diagrams illustrating a flow of operations for carrying out the diagnostic of this invention with the PCV system of FIG. 1.
Figure 3A:
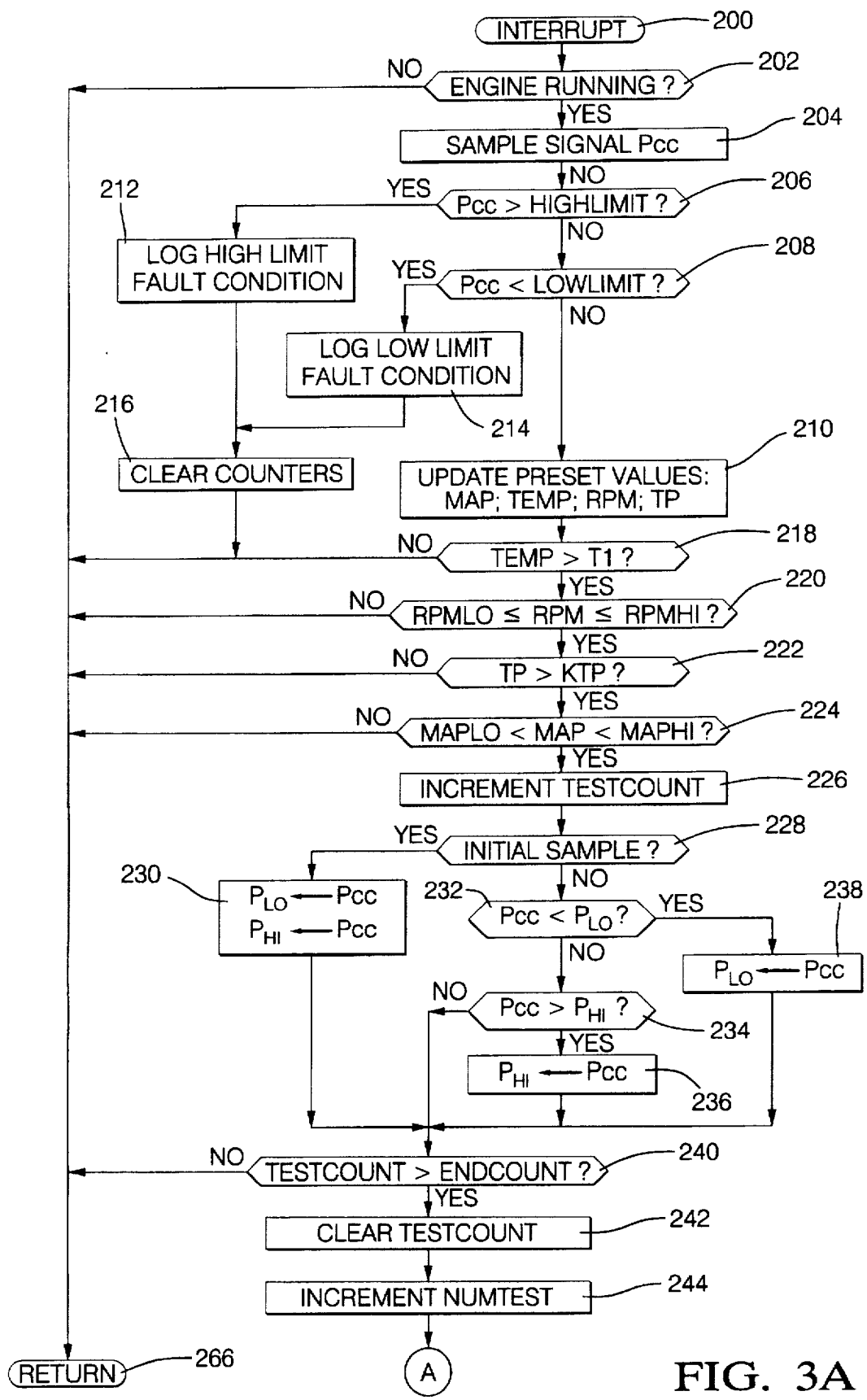
Figure 3B:
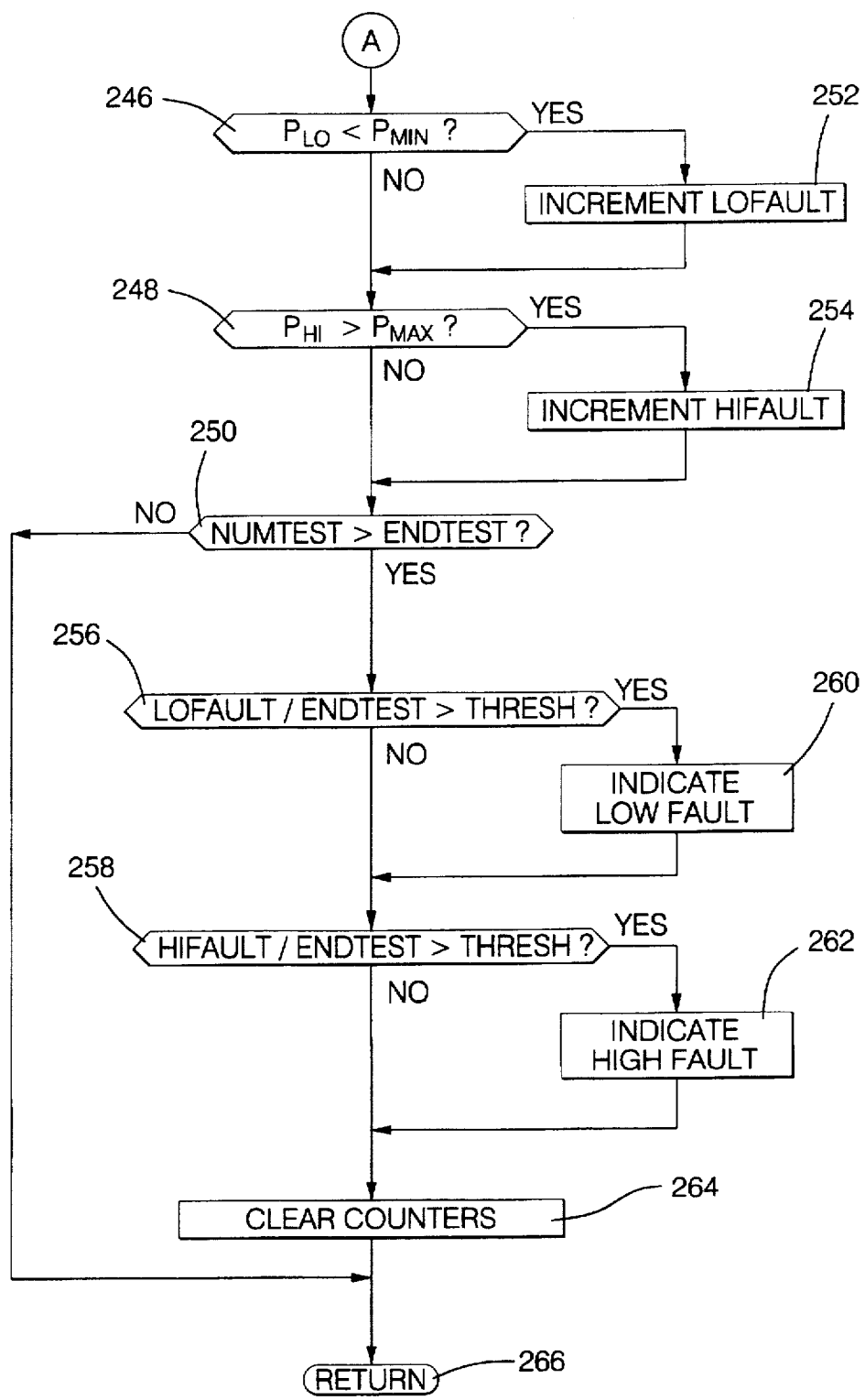

More specifically, the series of operations for diagnosing PCV system restriction or leak conditions and for self-diagnosis in accord with this invention are illustrated in a step by step manner in FIGS. 2, 3A and 3B. The operations of FIG. 2 are initiated at a step 100 when ignition power is applied to the controller 60 of FIG. 1 as described, such as manually by the engine operator. The routine then proceeds to carry out general initialization operations at a step 102 including clearing memory locations, and setting pointers, flags and counters to initial values. Specific counter locations in RAM 66 (FIG. 1) having the labels LOFAULT, HIFAULT, NUMTEST, and TESTCOUNT, to be described, are next cleared at a step 104. Conventional event-based and timer-based interrupts are next enabled to occur following specific engine events or at specific times at a next step 106. Such interrupts may, for example, occur following combustion events in engine cylinders. After enabling interrupts, background operations are carried out at a next step 108 including, for example, controller maintenance and security operations, and relatively low priority control and diagnostic operations. Such background operations are to be temporarily suspended upon occurrence of any of the enabled interrupts to allow for execution of interrupt service routines associated with the interrupts and composed of a series of instructions stored in ROM 64 (FIG. 1). Execution of the background operations is resumed upon completion of execution of interrupt service routines.

An interrupt service routine associated with a timer interrupt is illustrated in FIGS. 3A and 3B and is set up in this embodiment to occur about every 62.5 milliseconds while the controller is operating. Upon occurrence of the timer interrupt, the service routine is started at the step 200 and proceeds to determine if the engine is running at a step 202, such as may be indicated by the current value of input signals RPM or MAP. If the engine is determined to not be running, the diagnostic is not carried out, and the routine of FIGS. 3A and 3B is concluded at a next step 266 whereby the controller 60 returns to continue with execution of any previously suspended operations, such as the background operations of FIG. 2.

If the engine is determined to be running at the step 202, operations of the diagnostic continue by sampling input signal Pcc at a next step 204 to indicate current crankcase pressure. The magnitude of the sampled signal is next compared to upper and lower signal limits at steps 206 and 208, respectively, to diagnose fault conditions in the sensor 46 (FIG. 1) or in the circuitry that drives the sensor, such as circuitry for providing voltage supply, reference and return signals between the sensor 46 and the controller 60 of FIG. 1. Specifically, Pcc is compared to a calibrated upper limit HIGHLIMIT at a step 206. HIGHLIMIT is set as the highest voltage Pcc can, due to sensor and sensor drive circuitry limitations, normally reach. If Pcc is determined to exceed HIGHLIMIT, the sensor is diagnosed as not providing reasonable information on crankcase pressure, and a high limit fault condition is logged at a next step 212, such as by storing a fault code in a non-volatile RAM location indicating the sensor output signal is above what is normally a physically realizable range. If Pcc does not exceed HIGHLIMIT at the step 206, it is compared to LOWLIMIT, representing the lowest level PCC should normally reach, due to sensor and sensor drive circuitry limitations, at a next step 208. If Pcc is less than LOWLIMIT, a low limit fault condition is next logged at a step 214, such as by setting a flag in nonvolatile RAM to indicate the sensor output is below what is normally its physically realizable range. After logging either the low limit or high limit fault condition at steps 212 or 214, diagnostic counters, such as those initialized at the step 104 of FIG. 2, are cleared to prepare for a next pass through the operations of FIGS. 3A and 3B. The diagnostic is then concluded by proceeding to the described step 266.

Returning to step 208, if PCC is not less than LOWLIMIT, the diagnostic continues by reading the current value of input signals including MAP, TEMP, TP, and RPM at a step 210 so that present values may, such as through standard filter processes, be determined for the respective parameters of manifold absolute pressure, engine coolant temperature, intake air valve position, and engine speed.

A series of entry conditions are next tested at steps 218–224 to determine if the engine is operating in a manner providing for an accurate measurement of the condition of the PCV system in accord with this embodiment. Specifically, engine coolant temperature TEMP is compared, at a step 218, to a calibrated temperature T1 of about ten degrees Celsius. If TEMP exceeds T1, engine speed RPM is next compared, at a step 220, to a calibrated speed range bounded by RPMLO of about 2600 r.p.m. and RPMHI of about 3400 r.p.m. If engine speed is within such range, then intake air valve position TP is compared, at a next step 222, to a calibrated position KTP, set to about fifty percent of its full range of travel in this embodiment. If TP exceeds KTP, then intake manifold pressure MAP is compared, at a next step 224, to a pressure range bounded by MAPLO of about ninety kiloPascals and MAPHI of about ninety-six kiloPascals. If all such conditions are met, the engine operating condition is suitable for accurate PCV system diagnostics and the diagnostic operations continue by incrementing a stored value TESTCOUNT at a next step 226. TESTCOUNT is a count of the number of diagnostic iterations during a single test period. Returning to steps 218–224, if any test condition is not met, further diagnostic operations are temporarily suspended until all entry conditions are met by proceeding to the described step 266.

Returning to step 226, after incrementing TESTCOUNT, a determination is made whether the PCC sample taken at the step 204 is the first sample taken in the current test period. For example, if TESTCOUNT is currently set to one, then the current sample is the first of the test period. A test period is defined as the number of iterations of the operations of FIGS. 3A and 3B required to increase TESTCOUNT from zero through a calibrated value ENDCOUNT, to be described. A number of such test periods is required to complete a full test of the PCV system in this embodiment, as will be described.

Returning to step 228, if the current sample is the first sample in the test period, then stored values $P_{LO}$ and $P_{HI}$ are set to the value of the current pressure sample Pcc at a next step 230. However, if the current sample is not the first sample, then Pcc is compared to the stored value of $P_{LO}$ at a next step 232. If Pcc is less than $P_{LO}$, it is updated to hold the value of $P_{LO}$ at a next step 238. If Pcc is not Less than $P_{LO}$, it is compared to $P_{HI}$ at a next step 234. If Pcc exceeds $P_{HI}$ at the step 234, it is updated to hold the value of $P_{HI}$ at a next step 236. In this manner, at the completion of a test period, $P_{HI}$ will hold the value of the Pcc sample taken during the test period that has the greatest magnitude and $P_{LO}$ will hold the value of the PCC sample taken during the test period that has the smallest magnitude.

After updating $P_{HI}$ or $P_{LO}$, if necessary, at any of steps 230, 236, or 238, TESTCOUNT is compared to a calibrated value ENDCOUNT at a step 240 to determine if the current test period is complete. In this embodiment, ENDCOUNT is set to a value allowing for a test period of between one and five seconds of duration, such as about sixteen for the 62.5 millisecond interrupt that invokes the routine of FIGS. 3A and 3B. If TESTCOUNT does not exceed ENDCOUNT at the step 240, additional Pcc sample information is required before further diagnostic analyses may be carried out, and the current operations of the routine of FIGS. 3A and 3B are concluded by proceeding to the described step 266.

Figure 4:
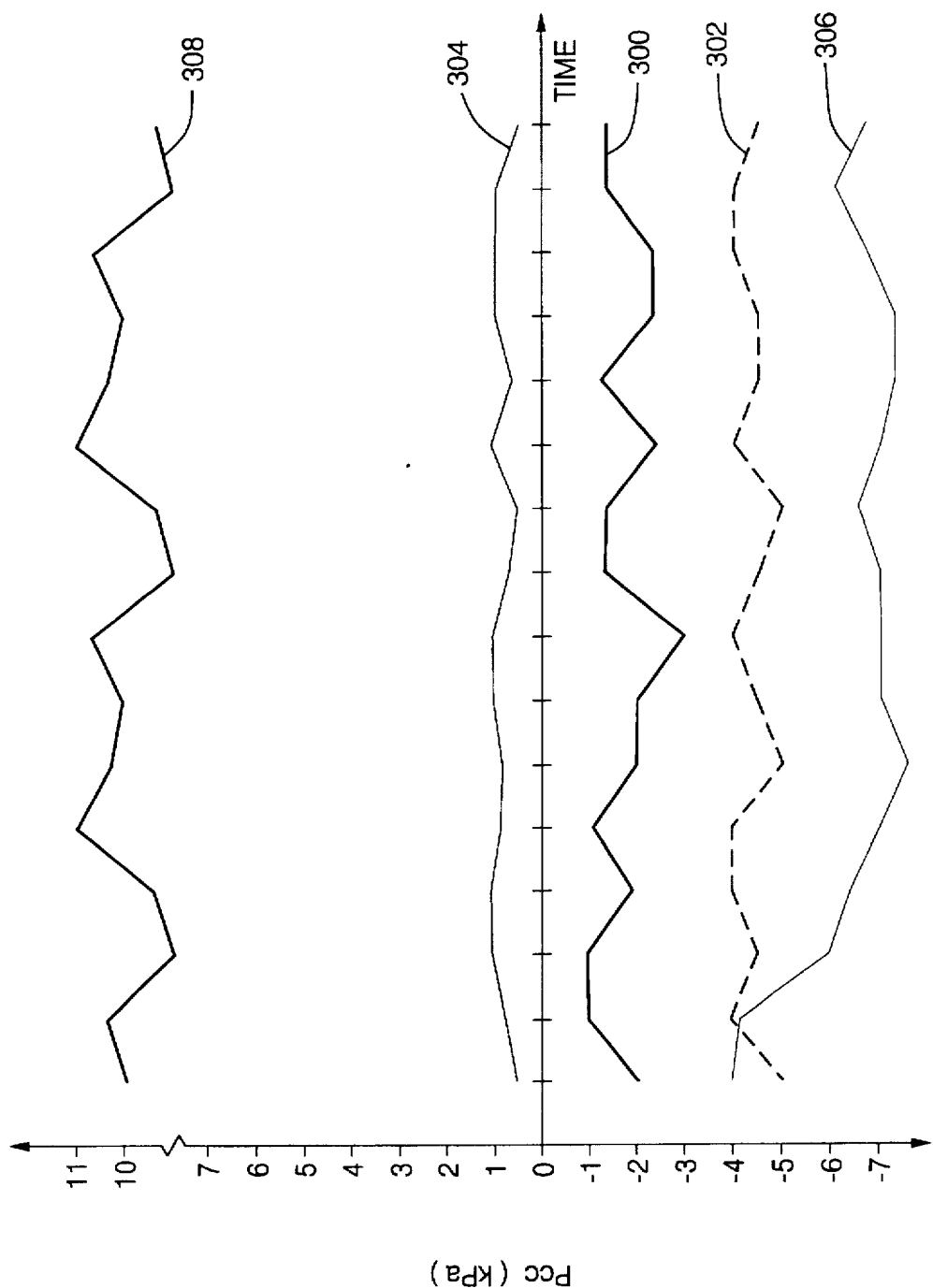
FIG. 4 is a graphical diagram illustrating crankcase pressure variation under normal operating conditions and under PCV system fault conditions as diagnosed through the operations of FIGS. 2, 3A, and 3B.

Alternatively, if TESTCOUNT exceeds ENDCOUNT at the step 240, TESTCOUNT is cleared at a step 242 to prepare for the next test period, and a stored value NUMTEST, indicating the number of completed test periods, is incremented at a next step 244. The stored value $P_{LO}$ for the completed test period is next compared to a calibrated minimum pressure value $P_{MIN}$ at a step 246. $P_{MIN}$ is calibrated as the minimum pressure the PCV system should normally be able to maintain under the operating conditions of steps 218–224, such as about −4.5 kiloPascals (kPa) in this embodiment. If the lowest pressure over the test period, stored as $P_{LO}$, is less than $P_{MIN}$, then a PCV system low pressure fault condition is assumed to be present, and is recorded by incrementing a low pressure fault counter LOFAULT, which may be stored in a RAM device 66 (FIG. 1). The low pressure fault condition may be the result of undesirable restriction in inlet passage 32 or in breather element 30 of FIG. 1. FIG. 4 illustrates such a fault condition as curve 306 which is significantly below a calibrated normal range of pressure in the crankcase, such as extending from −1 kPa in this embodiment to about −5 kPa. For example, curve 300 of FIG. 4 illustrates measured crankcase pressure for a "healthy" PCV system when the operating conditions of steps 218–224 of FIGS. 3A and 3B are met with a high TP value and curve 302 illustrates such pressure under the same general operating conditions under light load (low MAP and RPM) conditions. Both conditions correspond to Pcc values within the calibrated range of −2.5 to −4.5 kPa. However, as described, cure 306 illustrates the drop in Pcc magnitude under substantially the same operating conditions when the breather element 30 or the intake passage is restricted. The Pcc magnitude of curve 306 is persistently outside the normal range, which may be diagnosed through the operations of FIGS. 3A and 3B as a fault condition of a particular type.

Next, or if $P_{LO}$ is not less than $P_{MIN}$ at step 246, then $P_{HI}$ is compared to a calibrated maximum pressure value $P_{MAX}$ at a next step 248. $P_{MAX}$ is calibrated as the maximum pressure the PCV system should normally be able to maintain under the operating conditions described at the steps 218–224, and is set to about −2.5 kPa in this embodiment. If $P_{HI}$, representing the maximum sampled PCV system pressure during the completed test period, exceeds $P_{MAX}$, then the pressure in the PCV system has exceeded its normal range, for example due to undesirable restriction in the PCV valve 40 or in the outlet passage 42 of FIG. 1, and the condition is logged by incrementing PCV system high pressure fault condition counter HIFAULT at a next step 254. FIG. 4 illustrates data corresponding to such a fault condition as curve 304, which represents Pcc values under the operating conditions required by steps 218–224 of FIG. 3A but with significantly increased Pcc values due to a restriction in the PCV valve 40 due to a reduced application of intake manifold 20 vacuum to the PCV system. Such restriction may likewise be present in the outlet passage 42 having the same effect on Pcc. The Pcc is accordingly persistently outside its normal range which is diagnosed as a PCV system fault condition of a particular type. Additionally, in the event of restriction in both the PCV valve 40 and the intake passage 32 (or breather element 30), Pcc is elevated substantially in magnitude as illustrated by curve 308 which may be diagnosed as a fault condition through the operations of FIGS. 3A and 3B. Returning to FIG. 3B, following step 254 or if $P_{HI}$ does not exceed $P_{MAX}$ at step 248, the number of test periods, stored as NUMTEST, is compared to a limit value ENDTEST. ENDTEST, set to about one hundred in this embodiment, represents the desired number of test periods to be considered before determination of whether a persistent fault condition is present in the PCV system requiring energization of an indicator and storage of fault codes in non-volatile memory. Accordingly, if NUMTEST exceeds ENDTEST at the step 250, the persistence of low and high pressure fault conditions is examined. Specifically, the ratio of low pressure fault conditions LOFAULT to the number of test periods ENDTEST, is compared to a calibrated threshold THRESH, set to about twenty in this embodiment at a step 256. If the ratio exceeds THRESH, a sufficiently persistent low pressure fault condition is present that treatment of the condition is required and a low fault is indicated at a next step 260, such as by energizing the audible and/or visual indicator 70 of FIG. 1 to make the engine operator aware of the condition, and perhaps, additionally to set a fault code in a nonvolatile RAM device 66 (FIG. 1) to indicate the type of fault condition indicated, to aid in treatment of the condition. Next, or if the ratio does not exceed THRESH, a high pressure fault condition ratio is formed as the ratio of HIFAULT to ENDTEST, and is compared to THRESH at a step 258 to determine if the high pressure PCV system fault condition is sufficiently persistent to require treatment. If the ratio exceeds THRESH, a high pressure fault condition is next indicated by energizing the described audible and/or visual indicator 70 of FIG. 1 and, additionally, to store a fault code in non-volatile RAM 66 of FIG. 1 to indicate the type of fault condition to aid any applied fault treatment procedures. Next, or if the ratio does not exceed THRESH at the step 258, the counters, including LOFAULT, HIFAULT, NUMTEST, and TESTCOUNT, are cleared to prepare for the next diagnostic test period in accord with the continuous test procedure of this embodiment. After clearing the counters, or if NUMTEST does not exceed ENDTEST at the described step 250, the step 266 is executed to conclude the diagnostic operations of the current timer-based interrupt, so that any suspended controller operations may be resumed.

It should be pointed out that the diagnostic procedures of the preferred embodiment are but one of a variety of approaches for diagnosing the PCV system in response to sampled PCV system pressure. For example, time rate of change in PCV system pressure, for example between individual Pcc samples, may be compared to a calibrated time rate of change to diagnose "sluggishness" in the PCV system when the time rate of change is less than the calibrated value which may indicate leak conditions in the system. Still further, the degree of change of magnitude of the signal Pcc over a test interval, for example as indicated by a difference between $P_{LO}$ and $P_{HI}$ after each test period may be compared to a difference threshold and a sensor "stuck" fault condition may be diagnosed and indicated if the difference is persistently less than the difference threshold.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. A method for diagnosing fault conditions in an internal combustion engine crankcase ventilation system, comprising the steps of:

transducing crankcase pressure into a pressure signal;

repeatedly sampling the pressure signal over a test period;

storing a maximum sampled pressure;

storing a minimum sampled pressure;

comparing the maximum sampled pressure to a high pressure threshold following the test period;

diagnosing a fault condition when the maximum sampled pressure exceeds the high pressure threshold;

comparing the minimum sampled pressure to a low pressure threshold following the test period; and diagnosing a second fault condition when the minimum sampled pressure is less than the low pressure threshold.

2. The method of claim 1, further comprising the steps of:

determining a time rate of change in sampled pressure;

comparing the determined time rate of change to a minimum time rate of change; and diagnosing a sensor fault condition when the determined time rate of change is less than the minimum time rate of change.

3. The method of claim 1, further comprising the steps of:

sampling engine parameters indicating an engine operating condition; and determining when the sampled engine parameters indicate a predetermined stable engine operating condition; and wherein the step of repeatedly sampling the pressure signal repeatedly samples the pressure signal while the sampled engine parameters indicate the predetermined stable engine operating condition.

4. The method of claim 1, further comprising the steps of:

incrementing a fault counter when a fault condition is diagnosed;

periodically comparing the fault counter to a count limit; and indicating a fault condition when the fault counter exceeds the count limit.

5. The method of claim 1, further comprising the steps of:

providing a transducer signal range within which the pressure signal reliably indicates crankcase pressure;

comparing the sampled pressure signal to the transducer signal range;

diagnosing a transducer fault condition when the sampled signal pressure exceeds the transducer signal range; and discontinuing the first and second recited storing steps while the transducer fault condition is diagnosed.

6. In an automotive internal combustion engine crankcase ventilation system having an intake passage into the crankcase for providing fresh air thereto and a outlet passage from the crankcase to an engine intake manifold for drawing gasses out of the crankcase through a valve and recirculating the gasses into engine cylinders, an apparatus for diagnosing deterioration in the ventilation system, comprising:

a pressure transducer positioned in the ventilation system to transduce the pressure thereof into a pressure signal;

sampling circuitry for periodically sampling the pressure signal during a test period;

a memory device for storing the sampled pressure signal having a maximum magnitude;

a memory device for storing the sampled pressure signal having a minimum magnitude;

a memory device for storing upper and lower threshold values;

arithmetic logic circuitry for comparing the sampled pressure signal having the maximum magnitude to the upper threshold value and for comparing the sampled pressure signal having the minimum magnitude to the lower threshold value for diagnosing a fault condition; and an indicator for indicating a fault condition when the sampled pressure signal having the maximum magnitude exceeds the upper threshold value and when the sampled pressure signal having the minimum magnitude is less than the lower threshold value.

7. The apparatus of claim 6, further comprising:

a memory device for storing a count threshold;

arithmetic logic circuitry for storing a count of the number of diagnosed fault conditions and for comparing the stored count to the stored count threshold; and wherein the indicator indicates a fault condition when the stored count exceeds the stored count threshold.

8. The apparatus of claim 6 further comprising:

a memory device for storing a pressure difference threshold value;

wherein the arithmetic logic circuitry further generates a difference value representing a difference between sampled pressure signals and compares the difference value to the stored pressure difference threshold value, and wherein the indicator indicates a transducer fault condition when the difference value does not exceed the stored pressure difference threshold value.

9. The apparatus of claim 6, further comprising:

at least one engine parameter sensor for transducing at least one engine parameter value into a corresponding at least one sensor output signal; and arithmetic logic circuitry for determining an operating condition of the engine in response to the at least one sensor output signal;

and wherein the sampling circuitry samples the transducer output signal when the operating condition of the engine corresponds to a predetermined steady state operating condition.

10. The apparatus of claim 6, further comprising:

a memory device for storing signal limits defining a range of reliable pressure transducer signal values; and arithmetic logic circuitry for comparing the sampled pressure signal to the stored signal limits for diagnosing a pressure transducer fault condition when the sampled pressure signal exceeds the range defined by the stored signal limits, and wherein the indicator indicates the pressure transducer fault condition.

* * * * *